March 10, 1964 N. A. CROWDER ET AL 3,123,920

INSTRUCTION SYSTEM

Filed Oct. 16, 1959 4 Sheets-Sheet 1

INVENTORS
FRANKLYN G. NICKL
NORMAN A. CROWDER
BY Fulwider Mattingly & Huntley
Attorneys INVENTORS
FRANKLYN G. NICKL
NORMAN A. CROWDER
BY Fulwider Mattingly & Huntley
Attorneys

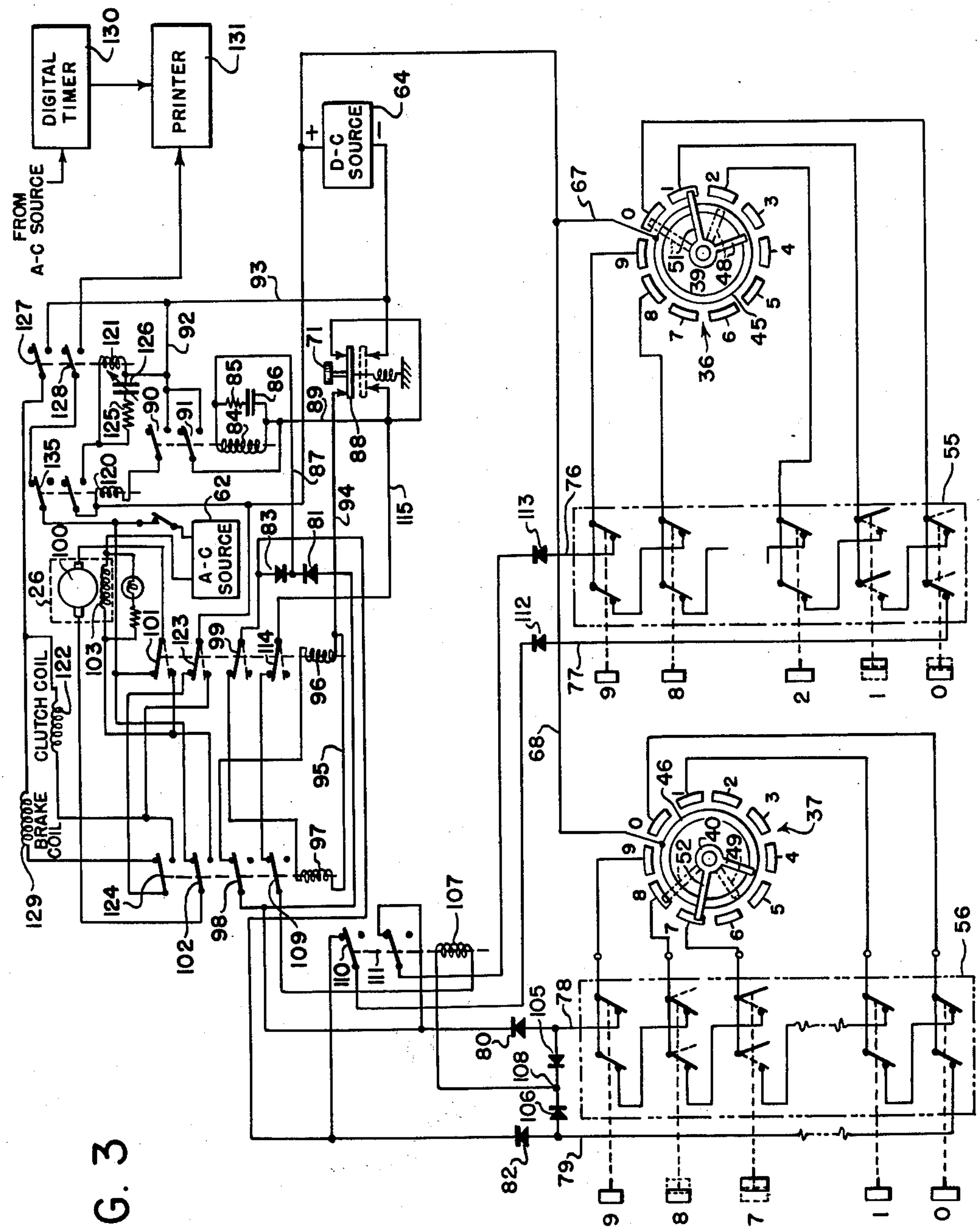
INVENTORS
FRANKLYN G. NICKL
NORMAN A. CROWDER
BY Fulwider Mattingly & Huntley
Attorneys INSTRUCTION SYSTEM
Filed Oct. 16, 1959 4 Sheets-Sheet 4
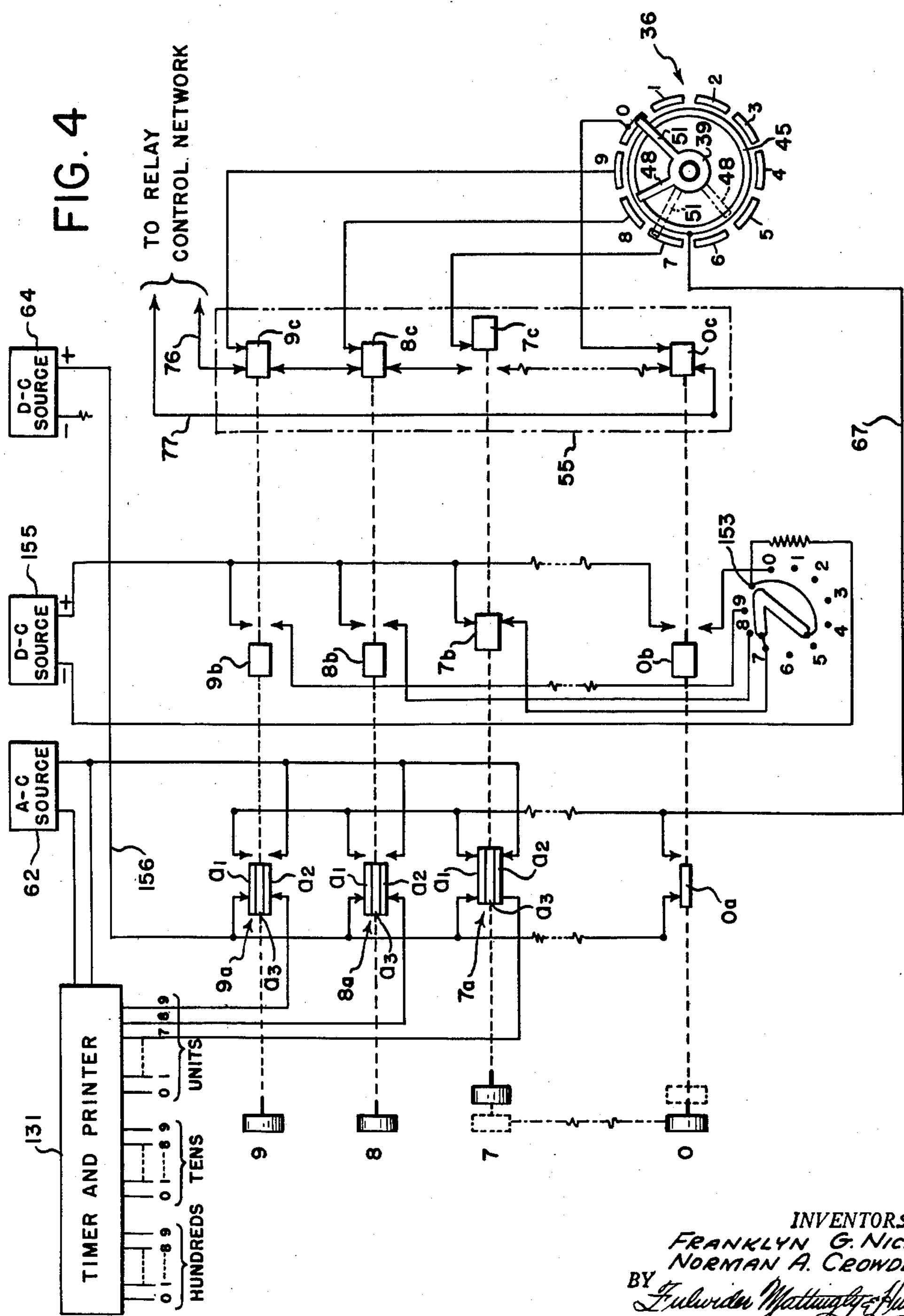
INVENTORS
FRANKLYN G. NICKL
NORMAN A. CROWDER
BY
Attorneys United States Patent Office 3,123,920

Patented Mar. 10, 1964

1

3,123,920

INSTRUCTION SYSTEM

Norman A. Crowder and Franklyn G. Nickl, Santa Barbara, Calif., assignors to U.S. Industries, Inc., New York, N.Y., a corporation of Delaware Filed Oct. 16, 1959, Ser. No. 846,840
9 Claims. (Cl. 35—9)

This invention relates to visual aids, and more particularly to a unique electrically operated visual display device for self-tutoring purposes.

As is well known, a student is best able to learn a course of study by proceeding at a pace measured by his own capabilities. In this connection, the best form of instruction is individual instruction. This, of course, means that an instructor must have time to devote to the particular student, so that he can direct the student through the course in a manner, and at a rate that is best for him.

As a practical matter, a student is rarely able to have the benefit of individual instruction as above described. This is due to the fact that under our current educational systems, both public and private, each instructor is faced with the problem of teaching an increasingly greater number of students. Instruction of large classes must be conducted at a compromise pace suited to what is believed satisfactory for the bulk of the students. This will be of necessity too slow for the fast learner and is often too fast for the slow learner.

One unfortunate result of his method of instruction is that the brighter students are held back. Another is that a number of students who are sufficiently intelligent to learn the course of study, but whose educational backgrounds have been limited in certain areas, will fall hopelessly behind. Such students can be greatly benefited by individual instruction which can proceed rapidly or slowly as dictated by the ability of the student to assimilate the subject matter.

Even the so-called "average student" benefits greatly from individual instruction because emphasis can be placed on his weak points and unnecessary reiteration of subjects he already understands can be avoided.

Educators have been made increasingly aware of the shortcomings of group instruction, and considerable study and experimentation has been directed to the deevlopment of self-tutoring devices which can serve the purpose of individual instruction. Motion picture films represent one major area of investigation for this purpose. For example, a number of films may be made, each covering the same course of study, but with the courses presented at a different pace in each film. Students may then be broken up into groups, and each film run for the benefit of the group for which it was designed. However, as is apparent, each of these groups of students can be broken down into average, above average, and below average students so that this method of presenting a course of study is not satisfactory for many students, for the same reasons as explained for larger groups.

One of the most serious drawbacks of prior art self-tutoring devices is that they are "wired" for a specific program of instruction. All buttons, switches, lights, etc., are connected with reference to a particular subject arrangement, and to a specific arrangement of questions and answers used in testing. As a result, a sequence of

2 operations is inflexibly "built-in" the machine, and such a machine cannot accommodate a new and different arrangement of subject matter, questions and answers, i.e., either a different machine is needed for each different arrangement, or the same machine must be re-wired for each different arrangement.

Self-tutoring devices as heretofore known are incapable of providing educators with information concerning the effectiveness of the manner in which a course of study is presented to pupils. For example, the arrangement of subject matter may overemphasize some points while not devoting sufficient time to other parts of the course. If a complete record can be made of the effectiveness of each part of the teaching program, revision in the manner of presenting the course material can readily be made so as to achieve maximum effectiveness. However, no statistical approach or method has heretofore been devised to determine these factors. Attempts to perfect the presentation of courses of study have heretofore been based solely on years of study, observation and experimentation. Even then, changes made are based upon the interpretation of the end result and of many factors by a variety of individuals, each of whom may have a different standard by which he measures results.

It is accordingly an object of this invention to provide unique self-tutoring apparatus which overcomes the above and other disadvantages of prior devices of this character.

It is another object of this invention to provide a self-tutoring device employing a film projector to present what may be termed "extra instruction" on certain aspects of a course of study to individual students only if they require such extra instruction to progress through the course.

A further object of this invention is to provide a self-teaching aid that employs a slide film projector in which various aspects of a course of study are presented in a logical sequence on frames which are in random distribution on the film, and providing selective control means for programming the display of frames on a viewing screen in logical sequence only in accordance with the individual student's ability to learn.

It is also an object of this invention to provide a self-teaching device that automatically records the time required for an individual student to assimilate each aspect of a course of study and to proceed to the next.

It is a still further object to provide, a tutoring device of the class described, a means for recording the number of mistakes made by the student in grasping various points presented in the course of study and also recording the amount and character of "extra instruction" that each seudent requires.

Yet another object of this invention is to provide an electrically operable self-tutoring device for leading an individual student through a course of study at a pace commensurate with his own individual ability, and which comprises a minimum number of component parts of simple design and rugged construction.

The above and other objects and advantages of this invention will become apparent from the following description, taken in conjunction with the accompanying drawings of an illustraitve embodiment thereof, in which.

Figure 1:
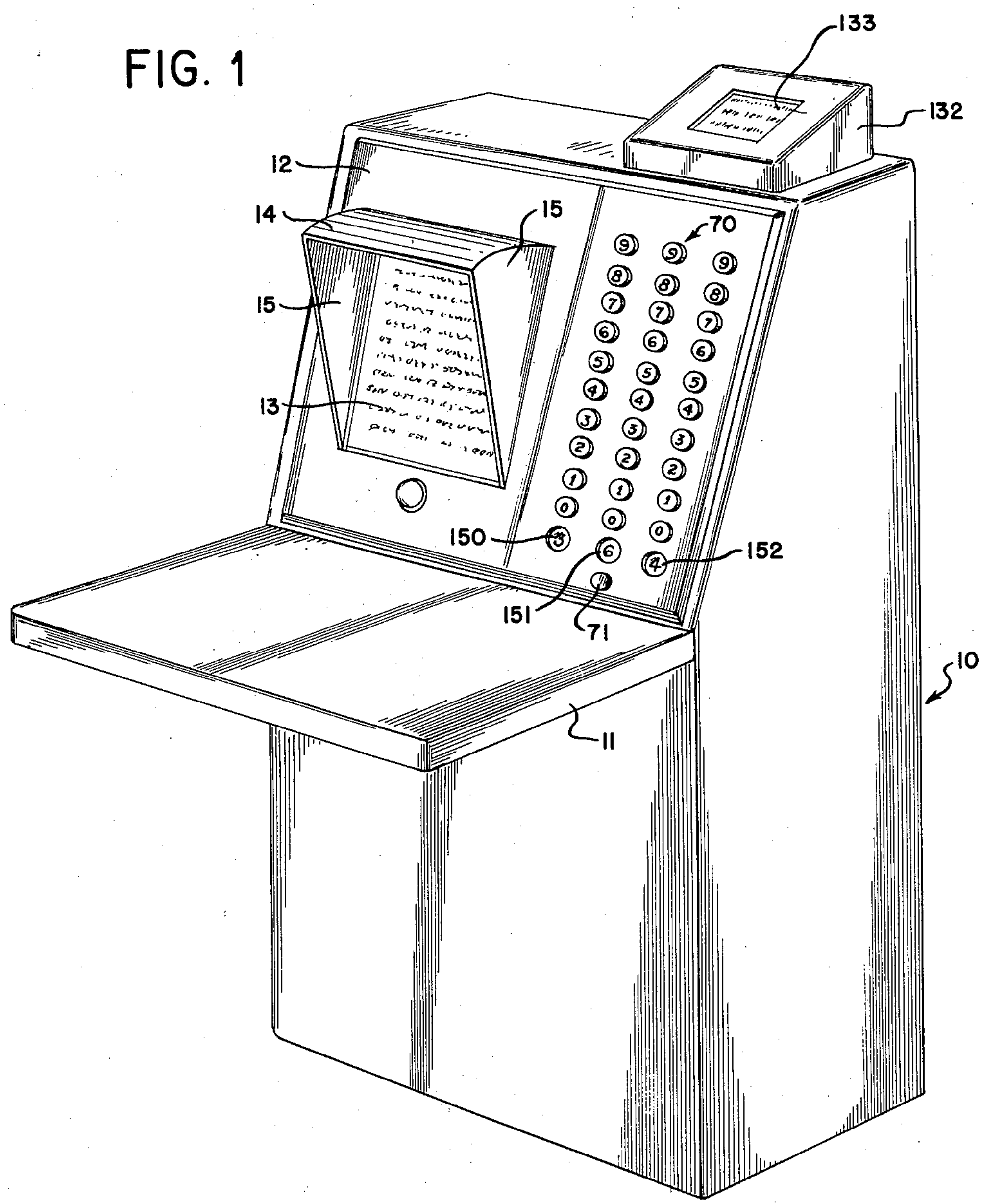
FIGURE 1 is a perspective view of a device embodying the invention enclosed in a housing having a display screen in which is projected frames of a training film, and showing an array of external switch controls for selecting the individual frames to be presented on the screen.

FIGURE 3 is a schematic diagram of control circuits associated with two banks of the switch controls on the front panel of the housing in FIGURE 1; and FIGURE 4 is a schematic diagram of the control system showing means, not only to control the direction and time of operation of the reel drive motor but also for providing a visual display on the front of the control panel of the identification number of the frame selected, and for recording the elapsed time since the previous selection was made.

Figure 2:
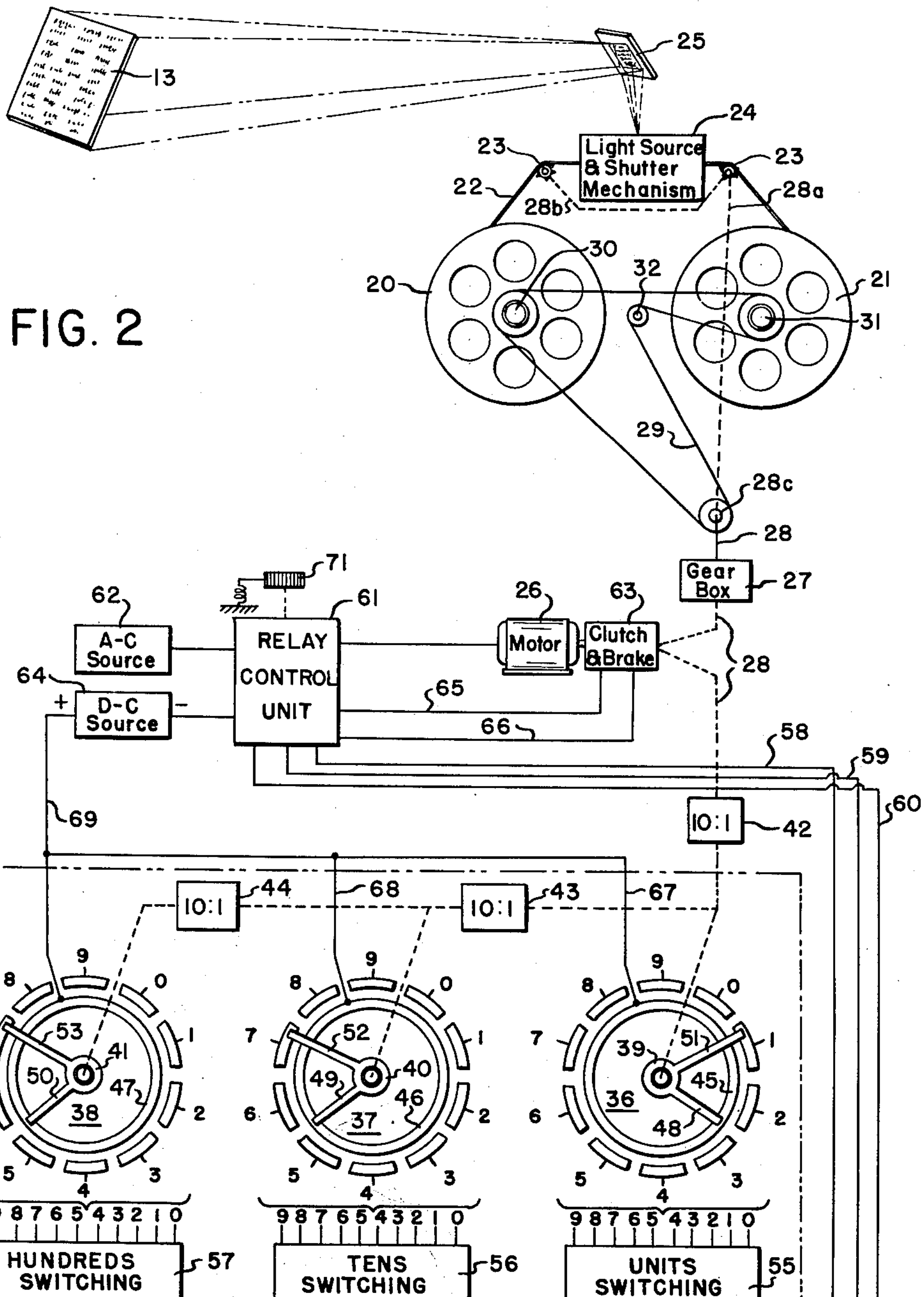
FIGURE 2 is a schematic diagram of the film reels, and the associated control system for selectively operating a drive motor to select and project any desired frame.

Referring to FIGURES 1 and 2, one form of our invention includes a housing 10 having a shelf 11 at desk height to provide working space for one sitting in front of the housing 10. The portion of the housing above the shelf 11 slants upwardly away from the shelf, and supports a panel 12 in which a screen 13 is located for viewing purposes. For ease of reading, there is provided a shade of opaque material that has a top 14 extending outwardly from the panel 12 at the top of the screen, and sides 15 of generally triangular configuration extending from the top panel 14 to the bottom of the screen 13.

Supported in the housing 10 (see FIGURE 2) is a projector mechanism employing a pair of reels 20, 21 for carrying a roll of film 22 which is adapted to be transported by sprockets 23 past a conventional light source, shutter mechanism and projection lens 24 by which images of frames on the film are projected and directed by a reflective element 25 onto the viewing screen 13. The sprockets 23 are adapted to be driven in either direction by a reversible motor 26 which operates through a shaft 28 and gear box 27. The output of the gear box 27 is drivably coupled to the sprockets 23 as indicated diagrammatically at 28*a* and 28*b*. A belt 29 is looped around a pulley 28*c* and the shaft 28*a* and around respective pulleys 30, 31 mounted on the axes of the supply and take-up reels 20, 21 to drive the latter. The above arrangement of the film drive together with that of the rotary switch drive to be described, is such that one revolution of the shaft 28 advances the film by exactly one frame and the unit switch rotor by one segment.

The motor is operated to position any desired frame adjacent the light source 24 for projection onto the screen 13. For example, if it is desired to view the image on a particular frame located a number of frames in one direction or the other from that currently being displayed on the screen 13, the motor 26 is operated to rotate the sprockets 23 and the reels 20, 21 in the proper direction until the desired frame is positioned adjacent the light source. To this end, we employ control means operable in accordance with a switch command system to actuate the motor 26 to drive the film from any position in the direction and for the distance necessary to bring a selected frame adjacent the light source.

One form of switch command system in accordance with our invention is illustrated in FIGURE 2 as a network 35 that includes switch elements that are positionable in accordance with a decimal system. For units, tens, and hundred digits, the command system 35 comprises three wafer type switches 36, 37 and 38 having respective rotatable contacts 39, 40 and 41.

The rotatable contact 39 is operated by the motor 26 through gear box 42. Each of the rotatable contacts 39 and 40 is coupled through decade transfer mechanisms 43 and 44 respectively to the rotor of the next higher order switch. Thus, the rotatable contact 39 rotates at one-tenth the speed of the drive shaft 28, the contact 40 rotates intermittently through one-tenth the angle of the contact 39, and the contact 41 rotaes intermittently through one-tenth the angle of the contact 40, i.e., one one-hundredth the angle of the contact 39.

The switch units 36, 37, 38 are provided with concentric bands or slip rings 45, 46, 47 with which the contacts 39, 40, 41 are always in engagement, as through radial arms 48, 49, 50. Surrounding each of the ring contacts 45, 46, 47, and in a circle concentric therewith are ten spaced contact segments 0, 1, 2, 3, 4, 5, 6, 7, 8, 9, and the contacts 39, 40, 41 are adapted, as through radial arms 51, 52, 53 to engage only one of the segmental contacts at a time.

For the switch 36, connections are made from the contacts 0, 1, 2, 3, 4, 5, 6, 7, 8, 9 to corresponding leads of a unit switching network 55. A tens switching network 56 has leads 0, 1, 2, 3, 4, 5, 6, 7, 8, 9, connected to corresponding contacts of the switch 37. Similarly, the contact segments 0, 1, 2, 3, 4, 5, 6, 7, 8, 9, of the switch 38 are connected to corresponding leads of a hundreds switching network 57. The output leads of the switching networks 55, 56, 57 are connected, as at 58, 59, 60, to a relay control unit 61.

The control unit 61 is provided for coupling an A.-C. source 62 to the motor in such manner that the motor is operated in a direction and to a position dictated by the settings of the switching networks 57, 56, 55. To aid in this respect, a clutch and brake mechanism 63 is coupled between the motor 26 and the shaft 28, and the control unit 61 is adapted to selectively couple a D.-C. source 64 to the clutch and brake devices, as through leads 65, 66 coupled to the clutch coil and brake coil. As shown, the D.-C. source 64 is also coupled through leads 67, 68, 69, between the control unit 61 and to each of the ring contacts 45, 46, 47.

The commands for the motor 26 are made from the control panel 12 of the housing 10. As seen in FIGURE 1, three parallel rows of push buttons 70 are provided, the buttons in each row being numbered 0, 1, 2, 3, 4, 5, 6, 7, 8, 9. The buttons 70 of each row are arranged and mounted in conventional keyboard manner so that when any one button in a given row is depressed, it will lock in depressed position and when any other button in that row is depressed, the one previously depressed is automatically released and returns to its initial position. The push buttons in the right-hand row correspond to the respective unit digits; the buttons of the middle row correspond to the respective tens digits; and the buttons of the left-hand row correspond to the respective hundred digits.

To illustrate the operation of our invention as thus far described, let it be assumed that there are one thousand frames on the film 22, and that the frames are numbered consecutively from 000 to 999. Also, assume that a frame numbered 588 is being projected onto the screen 13, and that it is desired to next view the frame numbered 364. The operator depresses the push buttons 3, 6, 4 in the respective rows corresponding to the hundreds, tens and units digits.

Operation of the control unit 61 is effected through an overall command execution switch that is actuated by a spring biased view control button 71 on the front of the control panel 12. In the above example, depressing the push buttons that correspond to the number 364 results in the hundreds, tens and units switching networks 57, 56, 55, the switches 36, 37, 38 and the control unit operating the motor 26 in the manner required to drive the film in a reverse direction, and to a position wherein frame number 364 is projected on the screen 13. To further illustrate how this operation is effected, reference will be made to FIGURE 3 as well as FIGURES 1 and 2.

For the sake of simplicity, FIGURE 3 illustrates that portion of the system operable to process commands established with the command buttons for the units and ten digits only. It will be evident from the description of FIGURE 3 that the system is adapted to process commands involving three, four or more digits.

As shown in FIGURE 3, the tens and units switching networks 56, 55 are identical. Each network employs respective pairs of switches mechanically connected to be operated by one of the buttons 0, 1, 2, 3, 4, 5, 6, 7, 8, 9. Both the movable contacts of each switch pair are conductively connected to the corresponding segmental contacts 0, 1, 2, 3, 4, 5, 6, 7, 8, 9, of the respective wafer switches 36, 37.

For each pair of switches, the contact as are normally closed in the undepressed position of the associated button. When the button is depressed, both pairs of contacts are opened. Additionally, one fixed contact of each switch is directly connected to one fixed contact of an adjacent switch, and the remaining fixed contacts of the switches operable by the "zero" button and "nine" button are connected to respective output leads 76, 77.

Thus, the switches are arranged so that if buttons were all in the undepressed position, the switches would be connected in a closed series between the leads 76, 77. However, as has been previously indicated, the buttons of each row are mechanically linked so that one of them is depressed at all times. Accordingly, the location of the open circuit in the bank of switches corresponds to the button that is depressed.

In the tens switching network 56, as with the unit switching network 55, respective fixed contacts of the switches operated by the "nine" and "zero" buttons are connected to leads 78, 79. The arrangement of the pairs of switches in the network 56 is identical with the switches in the network 55. In the same manner, the location of the open circuit in the series connected pairs of switches is dictated by the particular button 0, 1, 2, 3, 4, 5, 6, 7, 8, 9 that is depressed.

In the circuit of FIGURE 3, the "seven" button in the tens row is shown in depressed position, so that the movable contacts of the associated pair of switches are in the open position. Further, the "eight" button in the tens row is shown to have been depressed prior to depressing the "seven" button. For the units switching network 55, the "one" button is shown in the depressed position, with its associated switch arms in open position, and the "zero" button is shown to have just been released from the depressed to the undepressed position upon actuating the "one" button. Thus, the button operation indicated in FIGURE 3 is one of changing from the command "80" to the command "71."

It will now been seen that the rotatable contacts 39, 40 of the wafer switches 36, 37 are rotated by the motor 26, the arms 51, 52 sweeping the contact segments 0, 1, 2, 3, 4, 5, 6, 7, 8, 9, until the contact arms 51, 52 reach open circuit positions. At this point, the contact arms are caused to stop (on the "7" and "1" contact segments in the above example). Upon depressing the "7" button of the tens switching network 56, at a time when the "8" button was locked in depressed position, the latter button is released, thereby effecting closure of its associated switches and completing a circuit through the arm 52 and contact 40 to the control network 61. This operation completes a connection to the output lead 78 through the switches associated with the "8" and "9" buttons (from the ring contact 46).

In a similar manner, depressing the "1" button of the units switching network 55 results in the "zero" button being released so that the associated switches close. This completes the connection from the ring contact 45 of the wafer switch 36 through the contact 39 and the associated "zero" contact segment to the lead 77.

When the above described change in switching has been effected, subsequent operation of the motor 26 results in movement of the contact 40 of the wafer switch 37 through an angle needed to bring the arm 52 thereof into engagement with the "7" contact segment. In the arrangement of the wafer switches shown in FIGURE 3, this necessitates a counterclockwise movement of the contact 40. During such movement of the arm 52, the contact 39 rotates counterclockwise until it reaches the "1" contact segment.

When the arms 52, 51 of the contacts 40, 39 reach the respective "7" and "1" contact segments, the connections from the D.-C. source 64 through the leads 67, 68 and the wafer switches 36, 37 to the switching networks 55, 56 are broken as above described. When this occurs, the motor 26 is stopped, and in the above example, frame number "71" is displayed on the screen 13.

The control unit 61 which effects the above-described operations will now be described. As shown in FIGURE 3, the output leads 78, 79 of the tens switching network 56 are coupled through respective pairs of forward diodes 80, 81, 82, 83 to one end of a relay coil 84 that is shunted by an R-C (resistor-capacitor) network 85, 86. The junction of the diodes 81, 83 is connected, through a lead 87, to the one end of the coil 84.

The command execution or "view" button 71 carries a contact element 88 which, upon being actuated, engages a pair of fixed contacts, one of which is connected to the negative terminal of the D.-C. source 64 and the other of which is connected, at 89, to the end of the relay coil 84 opposite the lead 87. Thus, with the radial arm 52 of the wafer switch 37 in contact with the "8" contact segment, depression of the "seven" button and closure of the switches associated with the "8" button results in the D.-C. source 64 being connected across the relay coil 84.

The above-described operation energizes the relay coil 84 to close two sets of contacts 90, 91, one set 91 connecting the aforementioned opposite end of the relay coil 84 directly, through leads 92, 93 to the negative terminal of the D.-C. source 64. Thus, momentary closure of the view button 71 results in the relay coil 84 being energized and thereafter this relay acts (through the circuit to contacts 91) as a self-holding relay while the contact arm 52 moves from the "8" contact segment to the "7" contact segment.

The contact 88 in the normal (up) position of the view button 71 engages a pair of contacts, one of which is connected directly to the lead 89, i.e., to the relay coil 84, and the other of which is connected directly at 94, 95 to one end of each of a pair of relay coils 96, 97. The other end of the relay coil 96 is connected to a fixed contact that is normally engaged by a movable contact 98 controllable by the relay coil 97, such movable contact 98 being connected between the diodes 80, 81. Similarly, the other end of the relay coil 97 is connected directly to a fixed contact normally engaged by a movable contact 99 operable by the coil 96, such movable contact 99 being connected between the diodes 82, 83.

Thus, release of the view button 71, following momentary actuation thereof to energize the relay coil 84, results in the relay coils 96, 97 being adapted for connection across the D.-C. source 64. However, only one of the coils 96, 97 will be connected to the source, and this depends upon which of the output leads 78, 79 is connected through the wafer switch 37 to the positive terminal of the source 64. In the example shown, the contact 52 is engaged with the "8" contact segment at the time the view button 71 is depressed, so that it is the lead 78 that is coupled through the switch 37 to the positive terminal of the source 64. As will be seen, since the switches operated by the "7" button are open, the connection between the output lead 79 and the switch 37 is broken. Accordingly, in this example, it is the relay coil 96 that is energized upon releasing the view button 71. As will be made evident, the relay coil 97 is prevented from being energized when the relay 96 is energized.

The relay coils 96, 97 are respectively the "reverse" and "forward" control relays for the motor 26. In this instance, of course, the contact 40 of the wafer switch 37 is to be moved to a lower order segment. Accordingly, it is the "reverse" relay control coil 96 that is to be energized to establish operation of the motor 26 in the proper direction.

As shown, the armature 100 of the motor 26 is connected to respective movable contacts 101, 102 that are controlled by the relay coils 96, 97. The movable contacts are normally in closed positions wherein they are connected to one terminal of the A.-C. source 62. The field winding 103 of the motor is connected between the other terminal of the A.-C. source 62 and to respective fixed contacts associated with the movable contacts 101, 102. Thus, energization of one of the relay coils 96, 97 connects the armature 100 and the field winding of the motor in series across the A.-C. source 62. This will be seen to occur when the relay coil 96 is energized by virtue of its connection to the D.-C. source 64 as above explained; the movable contact 101 is brought into engagement with the contact that is connected to the field winding 103, thereupon completing a circuit from one terminal of the source through the field winding, the movable contact 101, the armature 100, and the movable contact 102 back to the other terminal of the source. As will be seen, energization of the relay 97 would reverse the connections to the armature 100.

As previously indicated, the programming or positioning of the movable contacts of the wafer switches is carried out in accordance with the decreasing order of the commands. To aid in this respect, respective diodes 105, 106 are connected in back-to-back relation with the diodes 80, 82, and a relay control coil 107 is connected between the junction 108 of the diodes 105, 106, and a movable contact 109 controlled by the relay coil 97. The relay coil 107 controls a pair of contacts 110, 111, to which the output leads 77, 76, from the units switching network 55 are connected through forward diodes 112, 113. The movable contacts 110, 111 normally engage fixed contacts that are connected respectively between the diodes 82, 83 and 80, 81.

As shown, the contact 109 operable by the relay coil 97 and a corresponding contact 114 operable by the relay coil 96 normally are in positions where they are connected together. The contact 114 is connected, as at 115, to one of the contacts that is engaged by the contact element 88 when it is depressed.

When the view button 71 is actuated, the relay coil 107 is connected through the wafer switch 37 and the contacts 109, 114, across the D.-C. source 64. The resultant energization of the relay coil 107 causes the contacts 110, 111 associated therewith to be moved to open positions, thereby to disconnect the output leads 76, 77 of the units switching network 55 from the control unit. When the view button 71 is released, the relay coil 107 remains energized through the movable contact 91, which, as previously described, is held in the closed position.

When the relay coil 107 is energized, the opening of the contacts 110, 111 prevents any connection being made through the control network to the relay coil 97. Thus, the relay coil 107 prevents any connection from lower order switching means to the relay coils 96, 97, thereby insuring that the direction of rotation of the motor 26 is established by the highest order switching network wherein a change in command is effected.

Once the relay 96 is energized, the relay 107 drops out, because the contact 114 is moved to an open position. Also, the contact 99 is moved to the open position, to prevent the relay coil 97 from being energized.

The relay coil 96 remains energized until the arms 52, 51 of the contacts 40, 39 reach the segments that correspond to the command. To this end, the normally closed contact 98 is connected to the source 64 through the lead 78 until the arm 52 steps from the "8" to the "7" contact segment.

When the arm 52 steps to the "7" contact segment, the arm 51 steps from its "0" contact segment to the "9" contact segment. Thereafter, and until the arm 51 reaches the "1" contact segment, the normally closed contact 98 is connected to the source 64 through the lead 76.

Upon the "1" contact segment of the switch 36 being contacted, connections to the source 64 through the both wafer switches 36, 37 are broken, whereupon the relay coil 96 is deenergized and the motor is stopped.

A safety feature resides in the fact that, although the coil 84 is disconnected from the source 64 simultaneously with the relay coil 96, the time constant of the RC network 85, 86 prevents the relay coil 84 from being instantly deenergized. If the mechanism does not stop at the proper frame number, i.e., if it "overshoots" to "70," the still-closed relay contact 91 establishes a connection from the source 64 through the "reverse" relay control coil 97, the closed contacts 99, 110, the lead 77, and the "0" switches and contact segment.

As previously explained, our system controls the clutch and brake mechanism. To effect their operation, there is provided a pair of relay control coils 120, 121, wherein one end of the relay coil 121 is connected, through the leads 92, 93, to the negative terminal of the D.-C. source 64, and one end of the coil 120 is connected to the positive terminal of the source. Upon energization of the relay coil 84, the other end of the coil 120 is connected to the negative terminal of the source 64, thereby energizing the coil 120 to connect the other end of the coil 121 to the positive terminal of the source. This operation results in connecting one end of the clutch coil 122 to the negative terminal of the source. The other end of the clutch coil 122 is connected to respective fixed contacts that are adapted, upon energization of the relay coils 96, 97 to be engaged by respective movable contacts 123, 124 for connection to the positive terminal of the source 64.

In the above example, energizing of the relay coil 96 results in the contact 123 connecting the clutch coil 122 to the positive terminal, thereby to energize the clutch coil to initiate operation of the contacts 39, 40 of the wafer switches 36, 37 in the desired manner. As will be readily apparent, deenergizing the relay coil 96 upon the command of number "71" being carried out, results in the clutch coil 122 being deenergized also.

Braking action, to further insure stopping of the motor precisely in the position wherein the desired frame is displayed on the screen 13, is effected through the relay control coils 84, 121. As with the control coil 84, the coil 121 is shunted by an R-C network 125, 126. The R-C network 125, 126 serves to create a current pulse of controlled duration to the brake, i.e., the brake coil 129 is energized from the time the contact 123 closes, until the contact 127 controlled by the relay 121 is opened.

Preparatory to describing the operation of our system, reference is made to the control circuit of FIGURE 3 wherein there is provided a digital timer 130 and a printer 131, wherein the timer 130 is adapted to measure time cumulatively, and the printer 131 is adapted, upon each operation of the "view" button 71, to record two items of information, namely, the command designation (e.g., "71") together with the cumulative elapsed time since the system was set into operation.

Referring to FIGURE 1, the printer mechanism is enclosed in a small container 132 mounted on the top of the housing 10, and provided with a window 133 through which the desired items which are printed on a roll of paper can be viewed.

In the circuit of FIGURE 3, the timer 130 is shown to have its input connected to the A.-C. source, and the printer 131 is adapted to have its input coupled to the A.-C. source 62. When neither of the relay coils 121, 122 is energized, or when both of them are energized, the printer is decoupled from the source 62. However, after energizing both relay control coils 120, 121, their subsequent deenergization is effected successively, the relay coil 121 being deenergized after the coil 120 is deenergized. At the moment the relay coil 120 is deenergized, the printer is coupled to the source 62, through contacts 128, 135, to receive a pulse for effecting its operation.

In operating our invention as a self-tutoring mechanism, one approach is to number successive frames of the film consecutively. Each such frame contains information that constitutes a finite portion of a course of study. However, different frames of information that follow in logic sequence are not consecutive, i.e, the information items of the course of study are "scrambled" in their positions along the film so that a student cannot follow the course by proceeding through successive frames along the film.

Preferably, respective frame portions in a course of study contain a certain quantum of information, followed by a question based on that quantum and its relation to the portion of the course thus far covered. Such question is followed by multiple choice answers, each of which is associated with a different frame number. One of the answers is correct, so that if the student chooses that answer, he is immediately directed to the next logically sequential item in the course of study. If, however, he chooses a wrong answer, he is directed to what may be termed an "extra instruction" portion of the course. This "extra instruction" portion may explain the student's error or may direct him to go back and re-read the material which he apparently failed to comprehend. In any event, the frame which he has been directed to after selecting a wrong answer contains instructions as to how he will proceed from that point.

The following example is a portion of a short course of study on the subject, "Introduction to Computer Number Systems." It will be understood that wherever, in the text, the student is directed to go to a particular frame, he will do so by first actuating the buttons on the front of the control panel 12 to set up (command) the order of digits corresponding to the desired frame number, and thereafter pressing the "view" button 71, to execute the command.

*Frame 1*

We ordinarily use a number system with ten different numerals: 0, 1, 2, 3, 4, 5, 6, 7, 8 and 9. Each single numeral is called a digit. Because the system uses ten different numerals or digits it is called the decimal system (Latin decem=ten). The arithmetic we learned in school is decimal arithmetic.

We are so familiar with the decimal system and decimal arithmetic that the decimal system may seem to use the "natural" system. Actually it is only one of many systems of writing numbers. As we will see later, electronic computers use a different system.

Now, here is a question on the material you have just read. Pick what you believe is the right answer to the question, and proceed to the frame number given in front of that answer.

The question is: Consider the two numbers 492 and .29. Are both of these numbers written in the decimal system?

Frame 4—Both 492 and .29 are written in the decimal system.
Frame 6—Only .29 is written in the decimal system.

*Frame 2*

You did not follow the instructions. In this type of instruction you do not proceed directly from Frame 1 to Frame 2. As you finish each frame you will find directions telling where to go to find the next frame you should read. The reason for this is that different people will go through this material in different ways. There is no place in this course that directs anyone to this frame, Frame 2. You should go back to Frame 1, therefore, and read the instructions again.

*Frame 3*

Your answer on frame 8 was: "Yes."

You are correct. A multiplication may involve any number of factors.

When we have a multiplication such as $$2\times3\times5=30$$

does it make any difference in what order we do the multiplying? Would we get the same result if we multiplied $2\times3$ and then multiplied that product by 5, as we would get if we multiplied $3\times5$ and then multiplied that result by 2?

In other words, does $$(2\times3)\times5=2\times(3\times5)?$$

Frame 10 Yes
Frame 12 No

*Frame 4*

Your answer on Frame 1 was: "Both 492 and .29 are written in the decimal system."

You are correct. The word "decimal" refers simply to the fact that our common number system uses only ten different numerals, or digits. With these ten single digits (0, 1, 2, . . . 9), we can count up to 9. Beyond 9 we must use combinations of these numerals, such as 1 and 0 for ten (10), 1 and 1 for eleven (11), etc.

Some number systems use more than ten different single digits, and some use fewer. For example, the ancient Babylonians used a system with sixty different single numerals. Modern electronic computers, on the other hand, use a system with only two different numerals, 0 and 1. To understand how arithmetic can be done in such a system, we are going to have to discuss number systems in some detail. But first, let's review some of the terms used in discussing arithmetic. Try the following question:

In the multiplications $3\times4=12$, the number 12 is called the product, and the numbers 3 and 4 are called:

Frame 7—quotients
Frame 8—factors
Frame 9—powers

*Frame 5*

Your answer on frame 8 was: "No."

Why not? A multiplication may involve any number of factors.

$$3\times4\times5\times7=420$$
$$3\times4\times5\times7\times11=4,620$$

In the first case shown there are four factors. In the second case there are five. We can multiply by as many factors as we like, of course.

Now return to frame 8 and try again.

*Frame 6*

Your answer on frame 1 was: "Only .29 is written in the decimal system."

When you first learned to write such quantities as $$.29=29/100$$
or
$$.4=4/10$$
or
$$.333=333/1000$$

you called these quantities "decimal fractions." This was probably the first time you had heard the word "decimal," and you remembered only the word "decimal" and forgot the "fraction." But the numbers less than 1, such as .29, or our other examples above, are properly called "decimal fractions." The word "decimal" simply refers to the fact that the numbers are written in a system that uses ten different digits: 0, 1, 2, 3, 4, 5, 6, 7, 8 and 9. Either whole or fractional numbers written in our common system may be called decimal numbers.

Now return to frame 1 and choose another answer.

*Frame 7*

Your answer on frame 4 was: "quotients."

A "quotient" is the number resulting from a division. For example, in the division $$3\overset{6}{\sqrt{18}};\ \text{that is,}\ \frac{18}{3}=6$$

the number 6 would be called the quotient. But our question concerned multiplication, not division. Return to frame 4 and try again.

*Frame 8*

Your answer on frame 4 was: "factors."

Your are correct. The numbers that are multiplied together to form a product are called "factors." Thus, in the multiplication $$3\times 4=12$$

3 and 4 are the factors and 12 is the product.

In the multiplication $$2\times 3\times 5=30$$

would the 2, 3, and 5 all be called "factors"?

Frame 3—Yes
Frame 5—No

*Frame 9*

Your answer on frame 4 was: "powers."

We'll get to powers of numbers pretty soon, but we're not there yet. The numbers that are multiplied together to form a product are called "factors," not "powers."

Now return to frame 4 and try again.

As will be apparent, our system is an individual instructor for coaching the student, and forcing him to learn thoroughly each item of information before he can proceed to the next. His problems are anticipated, as would be done by an individual instructor, and he learns at a pace commensurate with his capabilities. The execution of the commands is effected without having to re-set any sequence of events, as in the manner required for conventional teaching aids.

FIGURE 4 illustrates circuit control means in accordance with our invention wherein actuation of the buttons 70 effects illumination on the control panel 12 of an order of numbers corresponding to the order represented by the depressed buttons. As shown in FIGURE 1, annunciators 150, 151, 152 are exposed to view in the front panel 12, each annunciator being aligned with a row of the buttons 70. Thus, if the depressed buttons are "3," "6," "4," the annunciators illuminate this same order of numerals.

One type of annunciator suitable for this purpose is the so-called Nixe bulb. FIGURE 4 illustrates a Nixe bulb circuit that is controlled by the units row of command buttons. As is well known, such a bulb circuit includes closed gaseous (neon) tube paths, each formed in the shape of a respective one of the numerals 0, 1, 2, . . ., 8, 9. The paths are connected between a common terminal 153 and corresponding terminals 0, 1, 2, . . ., 9. By way of example, the path that is shaped like the numeral "7" is shown connected between the terminal 153 and the "7" terminal. When these terminals are connected to a voltage source, the gas is caused to glow and make the numeral visible.

Each of the buttons 0, 1, . . . , 9 is mounted on a respective shaft which supports three spaced contact members. These contacts, which are movable with the buttons, are designated *9a*, *9b*, *9c*; *8a*, *8b*, *8c*; . . . *0a*, *0b*, *0c*. With the exception of the *0a* contact, the "*a*" contacts include a pair of contact elements *a1*, *a2* separated by an insulator *a3*. As shown, only a single element forms the *0a* contact. The "*b*" and "*c*" contacts are all single elements.

The "*b*" contacts are adapted to connect a D.-C. source 155 between the terminal 153 and the terminals 0, 1, . . . , 9 for the Nixe bulb circuit; the negative terminal of the source 155 is connected to the common terminal 153 of the bulb circuit. When any button is depressed, its "*b*" contact connects the positive terminal of the source 155 to the associated terminal of the bulb circuit. Thus, when the "7" button is depressed, the corresponding "7" terminal of the bulb circuit is connected to the positive terminal of the source 155.

The "*c*" contacts are operated by the command buttons to perform the switching functions heretofore described for the units switching network 55. As shown, when a command button is undepressed, the "*c*" contact engaged a group of three fixed contacts wherein one contact is connected to a respective contact segment 0, 1 . . . 9 of the wafer switch 36. The remaining fixed contacts associated with the command buttons 1, 2 . . . 8 are connected to respective fixed contacts associated with adjacent command buttons. The output leads 76, 77 are connected to one of the fixed contacts associated with the "0" and "9" command buttons.

The slip ring 45 of the wafer switch 36 is connected to the positive terminal of the D.-C. source 64 through the "*a*" contact member that is connected to the depressed command button. To this end, the *a1* contact elements, and the *0a* contact element, have associated fixed contacts that are connected, respectively, through the lead 67 to the slip ring 45, and through a lead 156 to the positive terminal of the source 64.

When a command button 1, 2 . . . 9 is depressed, its *a1* contact element is positioned to complete the connection between the leads 67, 156. Similarly, when the "0" button is depressed, the *0a* contact element establishes a conductive connection between the leads 67, 156. Thus, as in the circuit arrangement of FIGURE 3, depressing any command button results in the slip ring 45 being connected to the positive terminal of the D.-C. source 64. Connection to the negative terminal is effected through the control network as above described. Thereafter, depressing the view button 71 effects operation of the motor drive for moving the control 39 until the arm 51 thereof reaches an open-circuit position.

The "*a*" contact members are also utilized to effect operation of the printer 131. To this end, the *a2* contacts have associated pairs of fixed contacts that are connected, respectively, to the A.-C. source 62 and to corresponding leads 0, 1 . . . 9 to the printer. These switching arrangements are such that the lead 0, 1 . . . 9 connected to the "*a*" contact member of the depressed command button is connected to the A.-C. source 62. Thus, as will be seen, the printer has an operating lead connected to the A.-C. source 62 that corresponds to the units digit command.

The same circuit arrangement as in FIGURE 4 is used for the remaining digit commands. The printer also has corresponding sets of leads 0, 1 . . . 9, e.g., as shown for the tens and hundreds of digits, so as to obtain the permanent record heretofore described.

The instruction system described herein has an additional advantage in that the light source and shutter mechanism 24 may include a conventional motion picture film transport mechanism. This permits the course of instruction recorded on the film to include a short motion picture sequence.

For example the film 22 includes a sequence (frames No. 100 to No. 300) which are successive motion picture frames. With the film stopped at frame No. 100, upon executing the command "300," these motion picture frames run at motion picture speed through the mechanism and thus present a short motion picture scene, stopping at frame No. 300. Here an appropriate instruction appears to resume the frame-by-frame presentation of the course.

The above described apparatus is fully capable of achieving the objects and providing the advantages hereinbefore set forth. It will be realized, however, that the apparatus is capable of considerable modification and variation without departing from the spirit of the invention. For this reason we do not mean to be limited to the exact device shown and described, but rather to the scope of the appended claims.

We claim:

1. A tutoring device comprising: a plurality of unitary record strips, each of said record strips containing thereon a plurality of sections of discrete finite items of information which when displayed in logical sequence define a course of study of a given subject, said discrete items being randomly positioned on each of said record strips in a physical sequence differing from said logical sequence and from the physical sequence of said discrete items on the others of said record strips, certain of said items including an inquiry and different possible answers thereto; display means for presenting said discrete items of a record strip, one at a time, for consideration; reversible drive means operatively connected to said display means to move a record strip past said display means to present any of said discrete items in said display means; indicia associated with said discrete items in said sections to indicate the physical location on a record strip of the next successive item to be considered in said logical sequence, each of said answers having said indicia associated therewith; and selectively operable control means operatively connected to said drive means to cause said drive means to move a record strip to positions indicated by said indicia independently of the item then displayed, said control means including manually actuated means for selecting an indicia and direction selection means for automatically determining the direction of movement of said drive means as a function of the item being displayed and the next selected item.

2. A tutoring device comprising: a plurality of film sections, each of said sections containing a plurality of frames of discrete finite items of information thereon and which when displayed in logical sequence define a course of study of a given subject, said discrete items being randomly positioned on each of said film sections in a physical sequence differing from said logical sequence and from the physical sequence of said discrete items on the others of said sections, certain of said items including an inquiry and different possible answers thereto; optical means for projecting said frames, one at a time, onto a screen for observation; reversible drive means operatively connected to said film to move said film past said optical means to project any selected frame onto said screen; indicia associated with said discrete items in said frames to indicate the physical location on the film of the next successive item to be considered in said logical sequence, each of said answers having said indicia associated therewith; and selectively operable control means operatively connected to said drive means to cause said drive means to move asid film to positions indicated by said indicia independently of the frame then displayed, said control means including manually actuated means for selecting an indicia and direction selection means for automatically determining the direction of movement of said drive means as a function of the frame being displayed and the next selected frame.

3. A tutoring device comprising: a plurality of film sections, each of said sections containing a plurality of frames of discrete finite items of information thereon and which when displayed in logical sequence define a course of study of a given subject, said discrete items being randomly positioned on each of said film sections in a physical sequence differing from said logical sequence and from the physical sequence of said discrete items on the others of said sections, certain of said items including an inquiry and different possible answers thereto; optical means for projecting said frames, one at a time, onto a screen for observation; a reel mechanism supporting said film; reversible drive means operatively connected to said reel mechanism to move said film past said display means to project any selected frame onto said screen; indicia associated with said discrete items in said frames to indicate the physical location on the film of the next successive item to be considered in said logical sequence, each of said answers having said indicia associated therewith; and selectively operable control means operatively connected to said drive means to cause said drive means to move said film to positions indicated by said indicia independently of the frame then displayed, said control means including manually operable switch means for actuation in accordance with selected indicia; and direction selection means for automatically determining the direction of movement of said drive means as a function of the frame being displayed and the next selected frame; a power source for operating said drive means; and relays interconnecting said switch means and power source to effect operation of said drive means in the proper direction to present the selected frame with the least possible film movement.

4. A tutoring device comprising: a plurality of unitary record strips, each of said record strips containing thereon a plurality of sections of discrete finite items of information which when displayed in logical sequence define a course of study of a given subject, said discrete items being randomly positioned on each of said record strips in a physical sequence differing from said logical sequence and from the physical sequence of said discrete items on the others of said record strips, certain of said items including an inquiry and different possible answers thereto; display means for presenting said discrete items of a record strip, one at a time, for consideration; reversible drive means operatively connected to said display means to move a record strip past said display means to present any of said discrete items in said display means; indicia associated with said discrete items in said record section to indicate the physical location on a record strip of the next successive item to be considered in said logical sequence, each of said answers having said indicia associated therewith; and selectively operable control means operatively connected to said drive means to cause said drive means to move a record strip past said display means to position another discrete item at said display means independently of the item then displayed, said control means including manually operable command means for selecting an indicia and direction selection means for automatically determining the direction of movement of said drive means as a function of the item being displayed and the next selected item; and a position reading circuit including movable switch means coupled to said strip for movement therewith to produce a separate circuit condition for each display position of said strip, said circuit conditions corresponding respectively to said information items; said manually operable command means associated with said circuit to precondition said circuit in accordance with a selected indicia designation for the next desired item in said logical sequence; and a comparison circuit continuously comparing the circuit conditions effected by said switch means with said command precondition to stop the movement of said strip when said condition and operatively connected to said drive means and precondition correspond.

5. In combination with a film projector having a reel mechanism and an optical system for projecting film images on a screen, wherein a length of film carried by the reel mechanism has frames identified by a code in the form of a sequence of characters arranged in orders, means for operating the projector for displaying on a screen images recorded on the film frames comprising: drive means for driving said reel mechanism in forward and reverse directions, said drive means having a forward run circuit and a reverse run circuit; a commutator means for each order of the code, each of said commutator means having a fixed output position for each character of the order, and means for connecting to said run circuits the output position corresponding to the code of the particular frame being projected; a plurality of manually operable frame selector switches for each order of the code, with a switch corresponding to each character of the order, each switch having a normal and a selected position, with each switch connected to the corresponding commutator output position; circuit means for connecting the switches of an order in series when in the normal positions to form a series circuit, with the series circuit open at a switch which is in the selected position; and circuit means for connecting the ends of a selector switch series circuit to said forward and reverse run circuits respectively whereby one of said forward and reverse run circuits is selectively actuated through the commutator means and the series circuit to drive the reel mechanism and project the selected frame and drive the commutator means to the output position of the selected switch, with the direction of drive dependent upon the relative positions of the commutator means and the selected switch.

6. In combination with a film projector having a reel mechanism and an optical system for projecting film images on a screen, wherein a length of film carried by the reel mechanism has frames identified by a code in the form of a sequence of characters arranged in orders, means for operating the projector for displaying on a screen images recorded on the film frames comprising: drive means for driving said reel mechanism in forward and reverse directions, said drive means having a forward run circuit and a reverse run circuit; a commutator means for each order of the code, each of said commutator means having a fixed output position for each character of the order, and means for connecting to said run circuits the output position corresponding to the code of the particular frame being projected; a plurality of manually operable frame selector switches for each order of the code, with a switch corresponding to each character of the order, each switch having a normal and a selected position, with each switch connected to the corresponding commutator output position; circuit means for connecting the switches of an order in series when in the normal positions to form a series circuit, with the series circuit open at a switch which is in the selected position; higher order circuit means for connecting the ends of a higher order selector switch series circuit to said forward and reverse run circuits respectively whereby one of said forward and reverse run circuits is selectively actuated through the higher order commutator means and series circuit to drive the reel mechanism and the commutator means to the output position of the higher order selected switch, with the direction of drive dependent upon the relative positions of the higher order commutator means and selected switch; lower order circuit means for connecting the ends of the next highest order selector switch series circuit to said forward and reverse run circuits respectively whereby the previously selected run circuit remains actuated through the next highest order commutator means and series circuit to continue driving the reel mechanism and project the selected frame and drive the commutator means to the output position of the next highest order selected switch; and means for actuating said lower order circuit means when the higher order commutator means is driven to the output position of the higher order selected switch.

7. In combination with a film projector having a reel mechanism and an optical system for projecting film images on a screen, wherein a length of film carried by the reel mechanism has frames identified by a code in the form of a sequence of characters arranged in orders, means for operating the projector for displaying on a screen images recorded on the film frames comprising: drive means for driving said reel mechanism in forward and reverse directions, said drive means having a forward run circuit and a reverse run circuit; a commutator for each order of the code, each of said commutators having a fixed contact for each character of the order, and a contact wiper for connecting to a power source the contact corresponding to the code of the particular frame being projected; a plurality of manually operable frame selector switches for each order of the code, with a switch corresponding to each character of the order, each switch having a normal and a selected position, with each switch connected to the corresponding commutator contact; circuit means for connecting the switches of an order in series when in the normal positions to form a series circuit, with the series circuit open at a switch which is in the selected position; and circuit means for connecting the ends of a selector switch series circuit to said forward and reverse run circuits respectively whereby one of said forward and reverse run circuits is selectively actuated from the power souce through the commutator and the series circuit to drive the reel mechanism and project the selected frame and drive the commutator wiper to the contact of the selected switch, with the direction of drive dependent upon the relative positions of the commutator wiper and the selected switch at the time the switch is selected.

8. In combination with a film projector having a reel mechanism and an optical system for projecting film images on a screen, wherein a length of film carried by the reel mechanism has frames identified by a code in the form of a sequence of characters arranged in orders, means for operating the projector for displaying on a screen images recorded on the film frames comprising: drive means for driving said reel mechanism in forward and reverse directions, said drive means having a forward run circuit and a reverse run circuit; a commutator means for each order of the code, each of said commutator means having a fixed output position for each character of the order, and means for connecting a run circuit actuating signal to the output position corresponding to the code of the particular frame being projected; a manual code selector switch means for each order of the code for setting the code identifying the desired frame for projection, each switch means comprising a plurality of serially connected contact sets connected between said forward and reverse run circuits and connected to the corresponding commutator output position, and means for opening a contact set corresponding to the code of the desired frame; and circuit means responsive to a run circuit actuating signal of a manually set selector switch means for selectively actuating a drive means run circuit to position the frame identified by the selector switch means setting for projection.

9. Self-tutoring apparatus comprising: a record strip carrying a plurality of items of information on respective sections, said items of information having a logical sequence, said items being scrambled in their respective positions along said strip so that successive items are not in logical sequence; code means in the form of a sequence of characters arranged in orders on said strip associated with each respective item for identifying the section on said strip of the next item in said logical sequence; means including a viewing station and transport means to position said strip with respect to said station to permit the items to be viewed; drive means for driving said transport means in forward and reverse directions, said drive means having a forward run circuit and a reverse run circuit; a commutator means for each order of the code, each of said commutator means having a fixed output position for each character of the order, and means for connecting to said run circuits the output position corresponding to the code of the particular item being viewed; a plurality of manually operable item selector switches for each order of the code, with a switch corresponding to each character of the order, each switch having a normal and a selected position, with each switch connected to the corresponding commutator output position; circuit means for connecting the switches of an order in series when in the normal positions to form a series circuit, with the series circuit open at a switch which is in the selected position; and circuit means for connecting the ends of a selector switch series circuit to said forward and reverse run circuits respectively whereby one of said forward and reverse run circuits is selectively actuated through the commutator means and the series circuit to drive the transport means and position the selected item for viewing and drive the commutator means to the output position of the selected switch, with the direction of drive dependent upon the relative positions of the commutator means and the selected switch.

References Cited in the file of this patent

UNITED STATES PATENTS

| | | |
|---|---|---|
| Re. 23,030 | Holt | Aug. 24, 1948 |
| 2,121,061 | Townsend | June 21, 1938 |
| 2,311,055 | Kopas | Feb. 16, 1943 |
| 2,323,372 | Bryce | July 6 1943 |
| 2,464,220 | Duncan et al. | Mar. 15, 1949 |
| 2,659,779 | Haley | Nov. 17, 1953 |
| 2,783,454 | North | Feb. 26, 1957 |
| 2,869,250 | Schiffman | Jan. 20 1959 |

FOREIGN PATENTS

| | | |
|---|---|---|
| 337,036 | Great Britain | Oct. 27, 1930 |
| 550,225 | Great Britain | Dec. 30, 1942 |

OTHER REFERENCES

Publication of Radio Corporation of America entitled "Electronic Teaching Devices," to be cited as RCA TN No. 51, Dec. 2, 1957 (3 pages).

UNITED STATES PATENT OFFICE
CERTIFICATE OF CORRECTION

Patent No. 3,123,920 March 10, 1964

Norman A. Crowder et al.

It is hereby certified that error appears in the above numbered patent requiring correction and that the said Letters Patent should read as corrected below.

Column 1, line 30, for "his" read -- this --; line 45, for "deevlopment" read -- development --; column 2, line 46, before "a tutoring device" insert -- in --; line 61, for "illustraitve" read -- illustrative --; column 3, line 75, for "rotaes" read -- rotates --; column 5, line 9, for "contact as are" read -- contacts are --; line 47, for "been" read -- be --; column 8, line 3, strike out "the", second occurrence; column 9, line 46, for "use" read -- us --; column 13, line 52, for "asid" read -- said --; column 14, lines 57 and 58, strike out "and operatively connected to said drive means" and insert the same after "precondition" in line 56, same column 14.

Signed and sealed this 4th day of August 1964.

(SEAL)
Attest:

ERNEST W. SWIDER
Attesting Officer

EDWARD J. BRENNER
Commissioner of Patents